(12) United States Patent
Murooka et al.

(10) Patent No.: US 8,111,458 B2
(45) Date of Patent: Feb. 7, 2012

(54) OPTICAL DEVICE

(75) Inventors: Takashi Murooka, Ashigarakami-gun (JP); Hideyasu Ishibashi, Ashigarakami-gun (JP); Ichiro Amimori, Minamiashigara (JP)

(73) Assignee: Fujifilm Corporation, Tokyo (JP)

( * ) Notice: Subject to any disclaimer, the term of this patent is extended or adjusted under 35 U.S.C. 154(b) by 369 days.

(21) Appl. No.: 12/350,577

(22) Filed: Jan. 8, 2009

(65) Prior Publication Data

US 2009/0174941 A1    Jul. 9, 2009

(30) Foreign Application Priority Data

Jan. 9, 2008  (JP) ................................. 2008-002595

(51) Int. Cl.
*G02B 27/28*   (2006.01)
(52) U.S. Cl. ............................... 359/486.01; 359/494.01
(58) Field of Classification Search .......... 359/489–494, 359/486.01–486.03, 494.01
See application file for complete search history.

(56) References Cited

U.S. PATENT DOCUMENTS

| | | | |
|---|---|---|---|
| 4,757,319 A * | 7/1988 | Lankl ............................ | 342/378 |
| 7,088,878 B2 * | 8/2006 | Waagaard et al. .............. | 385/11 |
| 2005/0286038 A1 * | 12/2005 | Albert et al. .................... | 355/71 |
| 2008/0049321 A1 * | 2/2008 | McEldowney et al. ........ | 359/494 |

FOREIGN PATENT DOCUMENTS

| | | |
|---|---|---|
| JP | 2995989 B2 | 12/1999 |
| JP | 2004-328213 A | 11/2004 |
| JP | 2006-113123 A | 4/2006 |
| WO | 2007/105767 A1 | 9/2007 |

OTHER PUBLICATIONS

Office Action, dated Aug. 2, 2011, issued by the Japanese Patent Office in corresponding JP Application No. 2008-002595, 3 pages in English and Japanese.

* cited by examiner

*Primary Examiner* — Frank Font
(74) *Attorney, Agent, or Firm* — Sughrue Mion, PLLC

(57) ABSTRACT

There is provided an optical device including a plurality of first phasors having substantially the same phase delaying axis as each other; and a plurality of second phasors having substantially the same phase delaying axis as each other in a direction different from that of the first phasors and providing a phase difference substantially the same as that provided by the first phasors, in which the plurality of first phasors and the plurality of second phasors are arranged on substantially the same face, a density of the first phasors is substantially the same as a density of the second phasors, and a spatial distribution of the density of the first phasors and a spatial distribution of the density of the second phasors are substantially uniform.

12 Claims, 5 Drawing Sheets

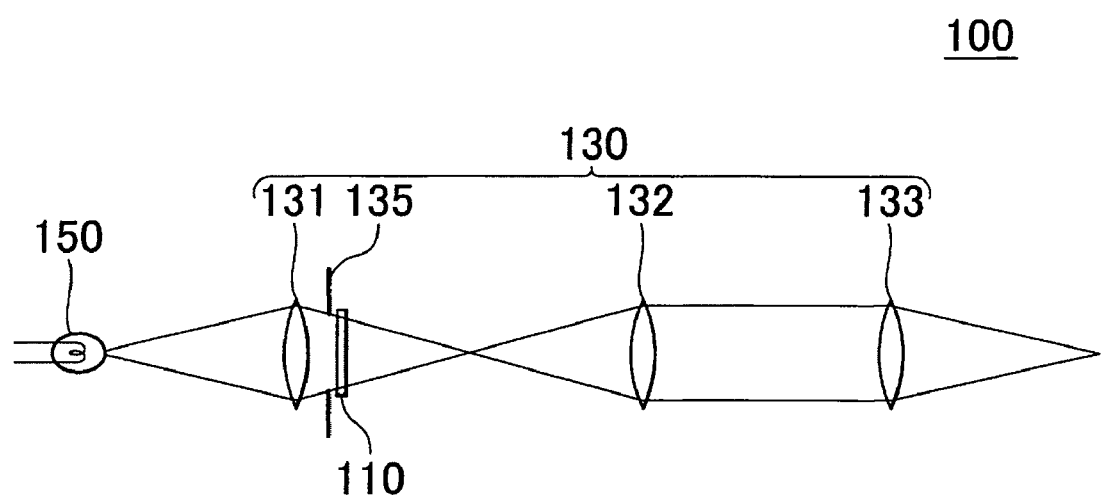
F I G . 1

(a)
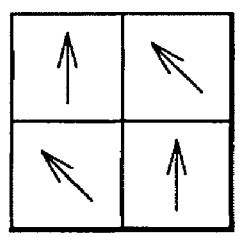 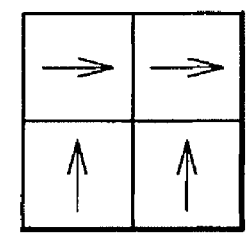
(b)
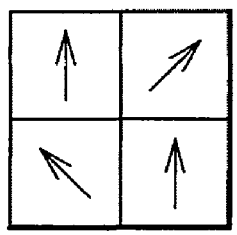 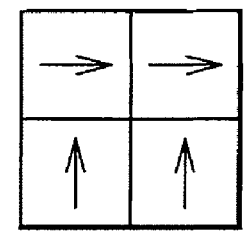
F I G . 4

OPTICAL DEVICE

CROSS REFERENCE TO RELATED APPLICATION

This patent application claims priority from a Japanese patent application No. 2008-002595 filed on Jan. 9, 2008, the contents of which are incorporated herein by reference.

BACKGROUND

1. Technical Field

The present invention relates to an optical device. More particularly, the present invention relates to an optical device including phasors.

2. Related Art

A depolarization plate obtained by laminating three wavelength plates having a predetermined phase difference and an in-plane azimuthal angle has been known as disclosed, for example, in Japanese Patent Application Publication No. 2006-113123. This depolarization plate functions as a ¼ wavelength plate in the wideband wavelength range between 400 nm and 700 nm. Moreover, there has been known a depolarization plate that is divided into two portions by a border line passing through the center of the depolarization plate, in which one side of the depolarization plate is a ½ wavelength plate an optical axis of which is parallel or perpendicular to the border line and the other side is a ½ wavelength plate an optical axis of which has an angle with the border line of 45 degrees, as disclosed, for example, in Japanese Patent No. 2995989.

Since the depolarization plate disclosed in Japanese Patent Application Publication No. 2006-113123 converts a ray of linearly-polarized light into a ray of circularly-polarized light (or elliptically-polarized light), it is impossible to acquire light obtained by scrambling a polarized component of the linearly-polarized light. Moreover, in the technique of Japanese Patent No. 2995989, it is impossible to obtain depolarized light on the whole face perpendicular to a direction in which light travels.

SUMMARY

Therefore, it is an object of an aspect of innovations of the present invention to provide an optical device that can solve the foregoing problems. The above and other objects can be achieved by combinations described in the independent claims. The dependent claims define further advantageous and exemplary combinations of the present invention.

That is, according to an aspect related to the innovations herein, one exemplary an optical device may include: a plurality of first phasors having substantially the same phase delaying axis as each other; and a plurality of second phasors having substantially the same phase delaying axis as each other in a direction different from that of the first phasors and providing a phase difference substantially the same as that provided by the first phasors, in which the plurality of first phasors and the plurality of second phasors are arranged on substantially the same face, a density of the first phasors is substantially the same as a density of the second phasors, and a spatial distribution of the density of the first phasors and a spatial distribution of the density of the second phasors are substantially uniform.

The summary does not necessarily describe all necessary features of the present invention. The present invention may also be a sub-combination of the features described above.

BRIEF DESCRIPTION OF THE DRAWINGS

FIG. 1 is a view exemplary showing an optical system 100 according to an embodiment.

FIGS. 4A and 4B are views showing other examples of arrangement of phasors in the first phasor array 210 and the second phasor array 220.

DESCRIPTION OF EXEMPLARY EMBODIMENTS

Figure 2:
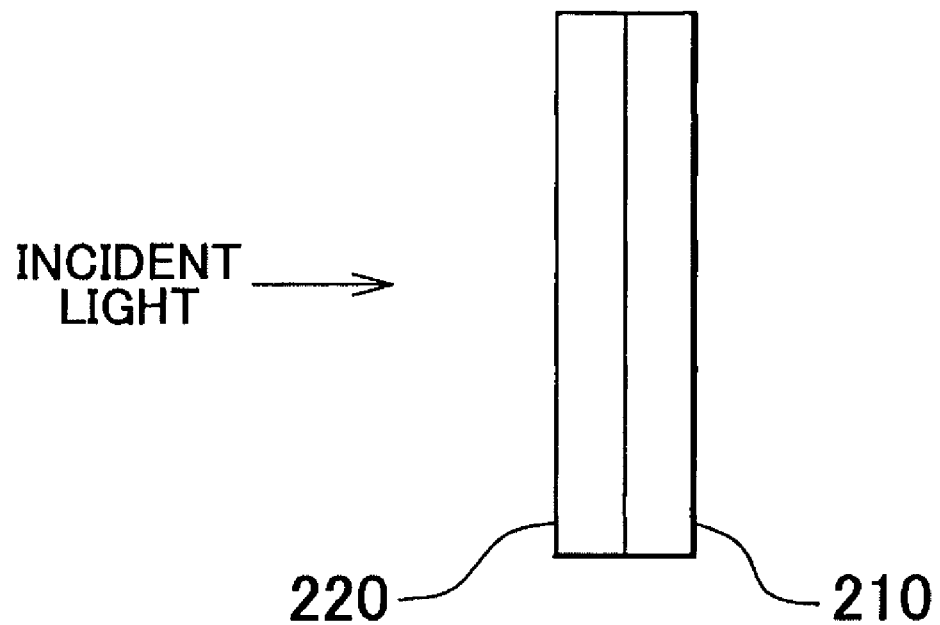
FIG. 2 is a view exemplary showing a cross section that is parallel to a propagation direction of incident light in an optical element 110.

The embodiments of the invention will now be described based on the preferred embodiments, which do not intend to limit the scope of the present invention, but just exemplify the invention. All of the features and the combinations thereof described in the embodiment are not necessarily essential to the invention.

FIG. 1 shows an example of an optical system 100 according to an embodiment. An object of the optical system 100 is to generate light of which polarized components are substantially removed. The optical system 100 includes a light source 150, a lens system 130, and an optical element 110. The lens system 130 includes a plurality of lenses 131 to 133 and a diaphragm 135. The lens system 130 collects light generated from the light source 150. In addition, the lens system 130 and the optical element 110 function as an optical device according to the present invention.

The light source 150 may be a polarized light source for emitting polarized light. The polarized light includes completely polarized light and partially polarized light. Specifically, the polarized light may be light of which degree of polarization is larger than a predetermined value. As an example, the light source 150 may be a laser source. The light generated from the light source 150 is incident on the lens 131. The light passing through the lens 131 is diaphragmed by the diaphragm 135.

The optical element 110 is provided in the vicinity of the diaphragm 135. The optical element 110 substantially removes depolarized components of the light that is emitted from the light source 150 and is diaphragmed by the diaphragm 135. The light passing through the optical element 110 is changed into light having a predetermined beam diameter by means of the lens 132 and the lens 133.

FIG. 2 shows an example of a cross section that is parallel to a propagation direction of incident light in the optical element 110. The optical element 110 has a first phasor array 210 and a second phasor array 220. The optical element 110 is formed by disposing the first phasor array 210 and the second phasor array 220 along the propagation direction of incident light. In addition, the outgoing face of light on the second phasor array 220 may be in contact with the incoming face of light on the first phasor array 210. In addition, as described below, as an example, the first phasor array 210 may be a ½ phasor array in which a plurality of ½ phasors is arranged, and the second phasor array 220 may be a ¼ phasor array in which a plurality of ¼ phasors is arranged.

Figure 3:
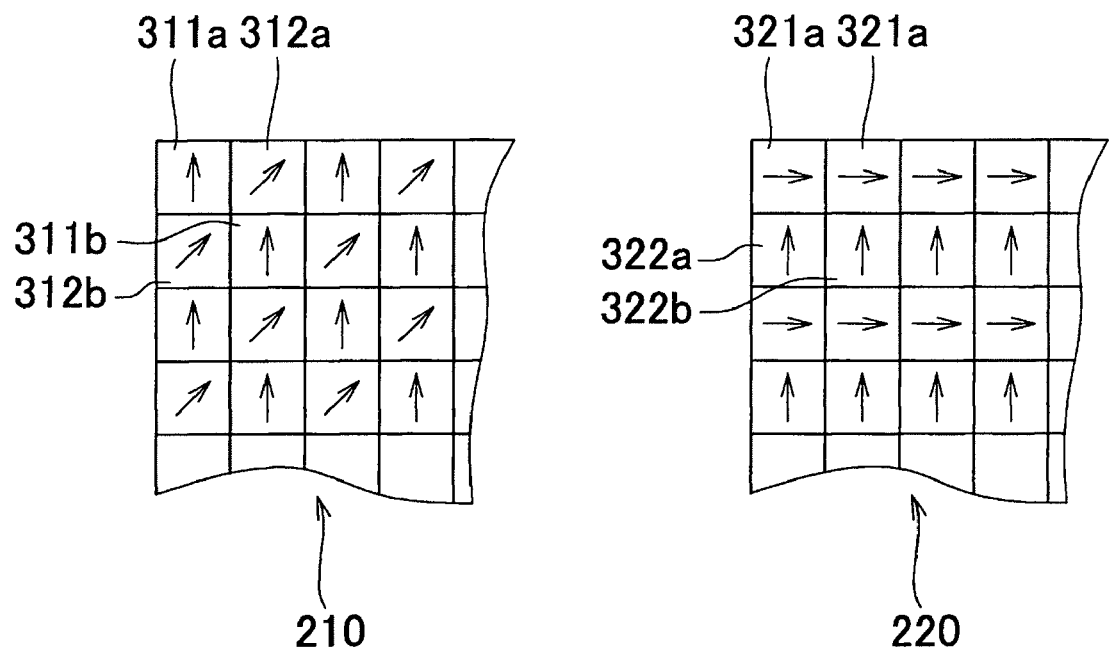
FIG. 3 is a view exemplary showing cross sections that are perpendicular to propagation directions of incident light in a first phasor array 210 and a second phasor array 220.

FIG. 3 shows an example of cross sections that are perpendicular to a propagation direction of incident light in the first phasor array 210 and the second phasor array 220. The first phasor array 210 includes first phasors 311a and first phasors 311b (hereinafter, referred to as first phasors 311), and second phasors 312a and second phasors 312b (hereinafter, referred to as second phasors 312). The first phasor array 210 is formed by arranging a plurality of units on a face, in which each unit includes the first phasor 311a, the first phasor 311b, the second phasor 312a, and the second phasor 312b.

In addition, a lattice of the first phasor array 210 shown in FIG. 3 shows either of the first phasor 311 and the second phasor 312 in the present invention, and an arrow in the lattice shows a direction of a phase delaying axis of each phasor. As shown in FIG. 3, the first phasors 311 have a phase delaying axis in the direction of the y axis, and the second phasors 312 have a phase delaying axis in a direction forming a 45 degree angle with the y axis.

In this manner, the second phasors 312 have a phase delaying axis in a direction different from that of the first phasors 311. Specifically, the phase delaying axis of the first phasors 311 and the phase delaying axis of the second phasors 312 substantially form an angle of 45 degrees. Moreover, the second phasors 312 provides substantially the same phase difference as that of the first phasors 311. Specifically, the first phasors 311 and the second phasors 312 may be ½ wavelength plates. In addition, the first phasors 311 and the second phasors 312 are arranged on substantially the same face. In addition, it is sufficient that the first phasors 311 and the second phasors 312 be arranged on substantially the same face, and thus it is not necessary that both phasors be arranged on completely the same face.

The second phasor array 220 includes third phasors 321a and third phasors 321b (hereinafter, referred to as third phasors 321), and fourth phasors 322a and fourth phasors 322b (hereinafter, referred to as fourth phasors 322). The second phasor array 220 is formed by arranging a plurality of units on a face, in which each unit includes the third phasor 321a, the third phasor 321b, the fourth phasor 322a, and the fourth phasor 322b. In addition, the third phasors 321 and the fourth phasors 322 provide a phase difference different from that provided by the first phasors 311 and the second phasors 312. Moreover, the fourth phasors 322 provides substantially the same phase difference as that of the third phasors 321. Specifically, the third phasors 321 and the fourth phasors 322 may be ¼ wavelength plates.

In addition, a lattice of the second phasor array 220 shown in FIG. 3 shows either of the third phasor 321 and the fourth phasor 322 in the present invention similarly to the first phasor array 210, and an arrow in the lattice shows a direction of the phase delaying axis. As shown in FIG. 3, the third phasors 321 have a phase delaying axis in the direction of the x axis, and the fourth phasors 322 have a phase delaying axis in the y-axis direction forming 90 degrees to the direction of the x axis. In this manner, the fourth phasors 322 have a phase delaying axis in a direction different from that of the third phasors 321. As an example, the phase delaying axis of the third phasors 321 is substantially perpendicular to the phase delaying axis of the fourth phasors 322. Moreover, the third phasors 321 and the fourth phasors 322 are arranged on substantially the same face. In addition, it is sufficient that the third phasors 321 and the fourth phasors 322 be arranged on substantially the same face, and thus it is not necessary that both phasors be arranged on a completely same face.

In this manner, the first phasor array 210 is formed by arranging the first phasors 311 and the second phasors 312 in a matrix. Moreover, the second phasor array 220 is formed by arranging the third phasors 321 and the fourth phasors 322 in a matrix. Then, the first phasor array 210 in which the first phasors 311 are arranged on a face and the second phasor array 220 in which the fourth phasors 322 are arranged on a face are arranged along a propagation direction of incident light.

In addition, in the first phasor array 210, densities of the first phasors 311 and the second phasors 312 may be substantially the same, and the spatial distribution of the density of the first phasors 311 and the spatial distribution of the density of the second phasors 312 may be substantially uniform. In addition, density may be the number of phasors per unit area, or may be the area occupied by phasors per unit area.

For example, the first phasor array 210 may have substantially the same number of the first phasors 311 and the second phasors 312, and the first phasors 311 and the second phasors 312 may be equally arranged on substantially the same face in a predetermined pattern. In addition, the first phasors 311 and the second phasors 312 may be arranged in random order. In addition, the first phasor 311 and the second phasor 312 may have substantially the same area. Moreover, the area occupied by the first phasors 311 in the first phasor array 210 and the area occupied by the second phasors 312 in the first phasor array 210 may be substantially the same.

Moreover, similarly, in the second phasor array 220, densities of the third phasors 321 and the fourth phasors 322 may be substantially the same, and the spatial distribution of the density of the third phasors 321 and the spatial distribution of the density of the fourth phasors 322 may be substantially uniform. In addition, density may be the number of phasors per unit area, or may be the area occupied by phasors per unit area.

For example, the second phasor array 220 may also have substantially the same number of the third phasors 321 and the fourth phasors 322, and the third phasors 321 and the fourth phasors 322 may be equally arranged in a predetermined pattern. In addition, the third phasors 321 and the fourth phasors 322 may be arranged in random order. In addition, the third phasors 321 and the fourth phasors 322 may have substantially the same area. Moreover, the area occupied by the third phasors 321 in the second phasor array 220 and the area occupied by the fourth phasors 322 in the second phasor array 220 may be substantially the same. In addition, it is preferred that densities of the first phasors 311, the second phasors 312, the third phasors 321, and the fourth phasors 322 be substantially the same.

In addition, the third phasors 321a and the first phasors 311a are aligned along the propagation direction of incident light so that the incident light passing through the third phasors 321a passes through the first phasors 311a. Moreover, similarly, the fourth phasors 322a and the second phasors 312a are aligned along the propagation direction of incident light so that the incident light passing through the fourth phasors 322a passes through the second phasors 312a. Moreover, the third phasors 321b and the first phasors 311b are also aligned similarly. The fourth phasors 322b and the second phasors 312b are also aligned similarly. In this manner, each of phasors including the plurality of first phasors 311 and the plurality of second phasors 312 is arranged along the propagation direction of incident light together with at least one of phasors including the plurality of third phasors 321 and the plurality of fourth phasors 322 which are included in the second phasor array 220.

Then, a density of the first phasors 311 and the third phasors 321 respectively arranged along the propagation direction of incident light, a density of the first phasors 311 and the fourth phasors 322 arranged along the propagation direction of incident light, a density of the second phasors 312 and the third phasors 321, and a density of the second phasors 312 and the fourth phasors 322 may be substantially the same. In other words, the densities of a set of the first phasors 311 and the third phasors 321 that are aligned, a set of the first phasors 311 and the fourth phasors 322 that are aligned, a set of the second phasors 312 and the third phasors 321 that are aligned, and a set of the second phasors 312 and the fourth phasors 322 that are aligned may be substantially the same.

Stokes parameters $(S'_0, S'_1, S'_2, S'_3)$ for outgoing light after passing through the optical element 110 are expressed by the following equation. In addition, in the following equation, Stokes parameters for incoming light are $(S_0, S_1, S_2, S_3)$, the angle of the optical axis for the phasors included in the second phasor array 220 is $\theta_1$, the angle of the optical axis for the phasors included in the first phasor array 210 is $\theta_2$, and the retardation for the second phasor array 220 is $\Delta$.

$$\begin{bmatrix} S'_0 \\ S'_1 \\ S'_2 \\ S'_3 \end{bmatrix} = \begin{bmatrix} 1 & 0 & 0 & 0 \\ 0 & \cos4\theta_2 & -\sin4\theta_2 & 0 \\ 0 & \sin4\theta_2 & \cos4\theta_2 & 0 \\ 0 & 0 & 0 & 1 \end{bmatrix} \begin{bmatrix} 1 & 0 & 0 & 0 \\ 0 & \cos2\theta_1 & -\sin2\theta_1 & 0 \\ 0 & \sin2\theta_1 & \cos2\theta_1 & 0 \\ 0 & 0 & 0 & 1 \end{bmatrix} \quad \text{[Equation 1]}$$

$$\begin{bmatrix} 1 & 0 & 0 & 0 \\ 0 & 1 & 0 & 0 \\ 0 & 0 & \cos\Delta & \sin\Delta \\ 0 & 0 & -\sin\Delta & \cos\Delta \end{bmatrix} \begin{bmatrix} 1 & 0 & 0 & 0 \\ 0 & \cos2\theta_1 & \sin2\theta_1 & 0 \\ 0 & -\sin2\theta_1 & \cos2\theta_1 & 0 \\ 0 & 0 & 0 & 1 \end{bmatrix} \begin{bmatrix} S_0 \\ S_1 \\ S_2 \\ S_3 \end{bmatrix}$$

By means of the above equation, when the incident light is respectively linearly-polarized light, elliptically-polarized light, and circularly-polarized light, Stokes parameter for light passing through the third phasors 321 and the first phasors 311, light passing through the fourth phasors 322 and the first phasors 311, light passing through the third phasors 321 and the second phasors 312, and light passing through the fourth phasors 322 and the second phasors 312 are respectively computed.

As an example, when the incident light is linearly-polarized light having $(S_1, S_2, S_3) = (0.5, 0.3, 0.0)$, $(S_1, S_2, S_3)$ components of the Stokes parameter for outgoing light passing through the above combined phasors are $(0.4, -0.4, -0.14)$, $(0.4, -0.4, 0.14)$, $(-0.4, 0.4, -0.14)$, and $(-0.4, 0.4, 0.14)$. When these $(S_1, S_2, S_3)$ components for the outgoing light are added every component, it becomes that $S_1=0$, $S_2=0$, and $S_3=0$. Therefore, the optical element 110 can substantially remove the polarization of the incident light of the above linearly-polarized light.

Moreover, when the incident light is elliptically-polarized light having $(S_1, S_2, S_3) = (-0.5, 0.7, 0.5)$, $(S_1, S_2, S_3)$ components of the Stokes parameter for the outgoing light passing through the above combined phasors are $(-0.25, -0.45, 0.85)$, $(0.45, 0.25, -0.85)$, $(0.25, 0.45, 0.85)$, and $(-0.45, -0.25, -0.85)$. When these $(S_1, S_2, S_3)$ components for the outgoing light are added every component, it becomes that $S_1=0$, $S_2=0$, and $S_3=0$. Therefore, the optical element 110 can also substantially remove the polarization of the incident light of the above elliptically-polarized light.

Moreover, when the incident light is circularly-polarized light having $(S_1, S_2, S_3) = (0, 0, -1)$, $(S_1, S_2, S_3)$ components of the Stokes parameter for the outgoing light passing through the above combined phasors are $(0.71, 0.71, 0.0)$, $(-0.71, -0.71, 0.0)$, $(-0.71, -0.71, 0.0)$, and $(0.71, 0.71, 0.0)$. When these $(S_1, S_2, S_3)$ components for the outgoing light are added every component, it becomes that $S_1=0$, $S_2=0$, and $S_3=0$. Therefore, the optical element 110 can also substantially remove the polarization of the incident light of the above circularly-polarized light.

In addition, the outgoing light obtained by passing through the optical element 110 microscopically has a polarized component. Therefore, a light diffusing section that diffuses a ray of light passing through the first phasor array 210 and the second phasor array 220 may be provided in the optical system 100. In addition, the light diffusing section may be provided in contact with the first phasor array 210. The light diffusing section may overlap light passing through the combinations of the above phasors by diffusing the outgoing light from the optical element 110. For example, the light diffusing section may diffuse the outgoing light from the optical element 110 to light which is diffused in the size order of the unit of the first phasor 311a, the first phasor 311b, the second phasor 312a, and the second phasor 312b or the unit of the third phasor 321a, the third phasor 321b, the fourth phasor 322a, and the fourth phasor 322b. Moreover, the lens system 130 may have an optical characteristic for diffusing the outgoing light from the optical element 110, and thus may function as a light diffusing section. A light diffusing section may diffuse outgoing light in the size order of a predetermined beam diameter when light is collected.

FIGS. 4A and 4B show other examples of arrangement of the phasors in the first phasor array 210 and the second phasor array 220. Arrows in lattices showing the first phasor array 210 in FIG. 4A show the directions of phase delaying axes for phasors located at the positions corresponding to the first phasor 311a, the first phasor 311b, the second phasor 312a, and the second phasor 312b shown in FIG. 3 among the phasors included in the first phasor array 210. Moreover, arrows in lattices showing the second phasor array 220 in FIG. 4A show the directions of phase delaying axes for phasors located at the positions corresponding to the third phasor 321a, the third phasor 321b, the fourth phasor 322a, and the fourth phasor 322b shown in FIG. 3 among the phasors included in the second phasor array 220. The second phasor array 220 in the present example has a phase delaying axes in the same directions as that of the second phasor array 220 shown in FIG. 3.

Moreover, similarly to FIG. 4A, arrows in lattices showing the first phasor array 210 in FIG. 4B show the directions of phase delaying axes for phasors located at the positions corresponding to the first phasor 311a, the first phasor 311b, the second phasor 312a, and the second phasor 312b shown in FIG. 3 among the phasors included in the first phasor array 210. In the configuration shown in FIG. 4B, the phase delaying axis of the second phasors 312a is substantially perpendicular to the phase delaying axis of the second phasors 312b. Even in this configuration, the phase delaying axis of the second phasors 312a and the phase delaying axis of the second phasors 312b together form an angle of substantially 45 degrees with the phase delaying axis of the first phasors 311b. In addition, the second phasor array 220 shown in FIG. 4B has a phasor array similar to that of the second phasor array 220 shown in FIG. 4A.

In this manner, it is preferred that the phase delaying axes of the second phasors 312 relatively has an angular difference of substantially 45 degrees to the phase delaying axes of the first phasors 311. Moreover, the direction of a phase delaying axis of each phasor is not limited to a specific direction in a specific coordinate system. Moreover, an angular difference between the angle of the phase delaying axis of the third phasors 321 and the angle of the phase delaying axis of the first phasors 311 may be optional. Moreover, in the above example, the first phasor array 210 and the second phasor array 220 are arranged along the propagation direction of incident light in the order corresponding to the second phasor array 220 and the first phasor array 210, but they may be arranged along the propagation direction of incident light in the order corresponding to the first phasor array 210 and the second phasor array 220.

Figure 5:
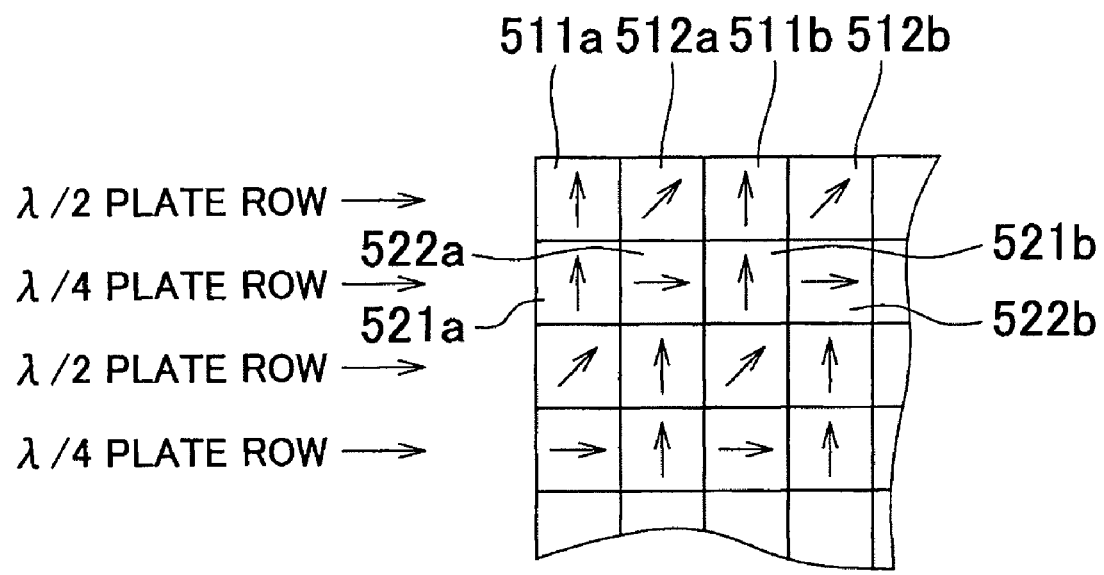
FIG. 5 is a view showing another example of a cross section that is perpendicular to the propagation direction of incident light in the optical element 110.

FIG. 5 shows another example of a cross section that is perpendicular to the propagation direction of incident light in an optical element 110. The optical element 110 includes a plurality of first phasors 511a and 511b (hereinafter, referred to as first phasors 511), a plurality of second phasors 512a and 512b (hereinafter, referred to as second phasors 512), a plurality of third phasors 521a and 521b (hereinafter, referred to as third phasors 521), and a plurality of fourth phasors 522a and 522b (hereinafter, referred to as fourth phasors 522).

In addition, the first phasors 511 and the second phasors 512 may be ½ wavelength plates similarly to the first phasors 311 and the second phasors 312, and the third phasors 521 and the fourth phasors 522 may be ¼ wavelength plates similarly to the third phasors 321 and the fourth phasors 322. In addition, the angles of phase delaying axes of the first phasors 511, the second phasors 512, the third phasors 521, and the fourth phasors 522 may be respectively equal to those of the first phasors 311, the second phasors 312, the third phasors 321, and the fourth phasors 322. Moreover, similarly to the first phasors 311 and the second phasors 312, a density of the first phasors 511 may be substantially the same as a density of the second phasors 512, and the spatial distribution of the density of the first phasors 511 and the spatial distribution of the density of the second phasors 512 may be substantially uniform.

Moreover, similarly to the third phasors 321 and the fourth phasors 322, a density of the third phasors 521 may be substantially the same as a density of the fourth phasors 522, and the spatial distribution of the density of the third phasors 521 and the spatial distribution of the density of the fourth phasors 522 may be substantially uniform. In this manner, the optical element 110 according to the present example has a function similar to that of the optical element 110 as described with reference to FIGS. 1 to 3 except that the plurality of third phasors 521 and the plurality of fourth phasors 522 are arranged on the same face together with the plurality of first phasors 511 and the plurality of second phasors 512.

Moreover, as shown in the present drawing, the first phasors 511 and the second phasors 512 are alternately arranged in the direction of the x axis so as to form a λ/2 plate row. Moreover, the third phasors 521 and the fourth phasors 522 are alternately arranged in the direction of the x axis in the direction perpendicular to the lined direction of the first phasors 511 and the second phasors 512 on the λ/2 plate row, so as to form a λ/4 plate row, in which the λ/4 plate row is provided in contact with the λ/2 plate row. Then, the λ/2 plate rows and the λ/4 plate rows having the same array are alternately arranged in the direction of the y axis, in order to form the optical element 110. The polarized light can be sufficiently removed even by the optical element 110 having such an arrangement.

Although the present invention has been described by way of an exemplary embodiment, it should be understood that those skilled in the art might make many changes and substitutions without departing from the spirit and the scope of the present invention. It is obvious from the definition of the appended claims that embodiments with such modifications also belong to the scope of the present invention.

The claims, specification and drawings describe the processes of an apparatus, a system, a program and a method by using the terms such as operations, procedures, steps and stages. When a reference is made to the execution order of the processes, wording such as "before" or "prior to" is not explicitly used. The processes may be performed in any order unless an output of a particular process is used by the following process. In the claims, specification and drawings, a flow of operations may be explained by using the terms such as "first" and "next" for the sake of convenience. This, however, does not necessarily indicate that the operations should be performed in the explained order.

What is claimed is:

1. An optical device comprising:
   a plurality of first phasors having substantially the same phase delaying axis as each other; and
   a plurality of second phasors having substantially the same phase delaying axis as each other in a direction different from that of the first phasors and providing a phase difference substantially the same as that provided by the first phasors, wherein
   the plurality of first phasors and the plurality of second phasors are arranged on substantially the same face,
   a density of the first phasors is substantially the same as a density of the second phasors, and
   a spatial distribution of the density of the first phasors and a spatial distribution of the density of the second phasors are substantially uniform, and
   wherein the first phasors and the second phasors are ½ wavelength plates,
   further comprising:
   a plurality of third phasors having substantially the same phase delaying axis as each other and providing a phase difference different from those provided by the first phasors and the second phasors; and
   a plurality of fourth phasors having substantially the same phase delaying axis as each other in a direction different from that of the third phasors and providing a phase difference substantially the same as that provided by the third phasors, wherein
   a density of the third phasors is substantially the same as a density of the fourth phasors,
   a spatial distribution of the density of the third phasors and a spatial distribution of the density of the fourth phasors are substantially uniform, and
   a first phasor array, including a plurality of first/second phasors, in which the plurality of first phasors and the plurality of second phasors are arranged and a second phasor array, including a plurality of third/fourth phasors, in which the plurality of third phasors and the plurality of fourth phasors are arranged are disposed along a propagation direction of incident light; and
   wherein the third phasors and the fourth phasors are ¼ wavelength plates.

2. The optical device as claimed in claim 1, wherein the phase delaying axis of the first phasors and the phase delaying axis of the second phasors form an angle of substantially 45 degrees.

3. The optical device as claimed in claim 1, wherein the phase delaying axis of the third phasors is substantially perpendicular to the phase delaying axis of the fourth phasors.

4. The optical device as claimed in claim 3, wherein densities of the first phasors, the second phasors, the third phasors, and the fourth phasors are substantially the same.

5. The optical device as claimed in claim 4, wherein
   each of phasors comprising the plurality of first phasors and the plurality of second phasors is arranged along a propagation direction of incident light together with at least one of phasors comprising the plurality of third phasors and the plurality of fourth phasors, and a density of the first phasors and the third phasors arranged along the propagation direction of incident light, a density of the first phasors and the fourth phasors arranged along the propagation direction of incident light, a density of the second phasors and the third phasors, and a density of the second phasors and the fourth phasors are substantially the same.

6. The optical device as claimed in claim 5, further comprising a lens system that collects incident light, wherein
the first phasor array and the second phasor array are arranged on a pupil plane of the lens system.

7. The optical device as claimed in claim 5, further comprising a light diffusing section that diffuses a ray of light passing through the first phasor array and the second phasor array.

8. The optical device as claimed in claim 2, further comprising:
a plurality of third phasors having substantially the same phase delaying axis as each other and providing a phase difference different from those provided by the first phasors and the second phasors; and
a plurality of fourth phasors having substantially the same phase delaying axis as each other in a direction different from that of the third phasors and providing a phase difference substantially the same as that provided by the third phasors, wherein
the plurality of first phasors, the plurality of second phasors, the plurality of third phasors, and the plurality of fourth phasors are arranged on substantially the same face,
a density of the third phasors is substantially the same as a density of the fourth phasors, and
a spatial distribution of the density of the third phasors and a spatial distribution of the density of the fourth phasors are substantially uniform.

9. The optical device as claimed in claim 8, wherein the third phasors and the fourth phasors are ¼ wavelength plates.

10. The optical device as claimed in claim 9, wherein the phase delaying axis of the third phasors is substantially perpendicular to the phase delaying axis of the fourth phasors.

11. The optical device as claimed in claim 10, wherein densities of the first phasors, the second phasors, the third phasors, and the fourth phasors are substantially the same.

12. An optical device comprising:
a plurality of first phasors having substantially the same phase delaying axis as each other; and
a plurality of second phasors having substantially the same phase delaying axis as each other in a direction different from that of the first phasors and providing a phase difference substantially the same as that provided by the first phasors, wherein
the plurality of first phasors and the plurality of second phasors are arranged on substantially the same face,
a density of the first phasors is substantially the same as a density of the second phasors, and
a spatial distribution of the density of the first phasors and a spatial distribution of the density of the second phasors are substantially uniform, and
wherein the first phasors and the second phasors are ½ wavelength plates,
further comprising:
a plurality of third phasors having substantially the same phase delaying axis as each other and providing a phase difference different from those provided by the first phasors and the second phasors; and
a plurality of fourth phasors having substantially the same phase delaying axis as each other in a direction different from that of the third phasors and providing a phase difference substantially the same as that provided by the third phasors, wherein
a density of the third phasors is substantially the same as a density of the fourth phasors,
a spatial distribution of the density of the third phasors and a spatial distribution of the density of the fourth phasors are substantially uniform, and
a first phasor array in which the plurality of first phasors and the plurality of second phasors are arranged and a second phasor array in which the plurality of third phasors and the plurality of fourth phasors are arranged are disposed on substantially the same plane; and
wherein the third phasors and the fourth phasors are ¼ wavelength plates.

* * * * *